US008190578B2

(12) United States Patent
Bernstein et al.

(10) Patent No.: US 8,190,578 B2
(45) Date of Patent: May 29, 2012

(54) MIGRATION OF VERSIONED DATA BETWEEN CONFIGURATION MANAGEMENT SYSTEMS

(75) Inventors: Howard B. Bernstein, Lexington, MA (US); Carol D. Yutkowitz, Lexington, MA (US); Maneesh Mehra, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 12/640,361

(22) Filed: Dec. 17, 2009

(65) Prior Publication Data

US 2011/0153557 A1    Jun. 23, 2011

(51) Int. Cl.
*G06F 7/00* (2006.01)
*G06F 17/00* (2006.01)
(52) U.S. Cl. ............... 707/665; 707/667; 707/695
(58) Field of Classification Search .............. 707/609, 707/661, 665, 667, 687, 694, 695
See application file for complete search history.

(56) References Cited

U.S. PATENT DOCUMENTS

| | | | | |
|---|---|---|---|---|
| 5,440,730 | A | * | 8/1995 | Elmasri et al. .............. 395/600 |
| 7,970,741 | B2 | * | 6/2011 | Lazzaro et al. .............. 707/663 |
| 2006/0010150 | A1 | * | 1/2006 | Shaath et al. .............. 707/102 |

* cited by examiner

*Primary Examiner* — Marc Somers
(74) *Attorney, Agent, or Firm* — Guerin & Rodriguez, LLP (57) ABSTRACT

Described is a method for migrating versioned data from a source configuration management system to a target configuration management system. The method includes determining, for at least one historical period having versioned data items to be migrated from the source to target systems, an earliest versioned data item based on a start time for the historical period. At least one subsequent versioned data item is determined based on a sampling interval and an end time for the historical period. The earliest versioned data item and subsequent versioned data items for each historical period are migrated from the source configuration management system to the target configuration management system. Advantageously, migration is performed faster than if all existing versions are migrated and storage requirements are reduced. In addition, differencing tools in the target system can compare different versions of the migrated data items.

23 Claims, 7 Drawing Sheets

MIGRATION OF VERSIONED DATA BETWEEN CONFIGURATION MANAGEMENT SYSTEMS

BACKGROUND

The invention relates generally to the field of software configuration management. In particular, the method relates to a method for migrating versioned data in a source configuration management system to a target configuration management system.

Software configuration management (SCM) systems are used to track and control changes to software during a software development project. In some circumstances, developers may wish to migrate versioned data managed by one SCM system to a different SCM system. A vendor providing the original or "source" SCM system may be different from the vendor of the "target" SCM system receiving the migrated data, resulting in difficulties in the migration process such that migration may not be efficiently or practically performed.

BRIEF SUMMARY

According to one embodiment of the invention, a method for migrating versioned data in a configuration management system includes determining, for at least one historical period having a plurality of versioned data items to be migrated from a first configuration management system to a second configuration management system, an earliest versioned data item based on a start time for the historical period. For each historical period at least one subsequent versioned data item is determined based on a sampling interval and an end time for the historical period. The sampling interval defines a desired time between the version times for the versioned data items to be migrated. The earliest versioned data item and the subsequent versioned data items are migrated from the first configuration management system to the second configuration management system for each historical period.

According to another embodiment of the invention, a method for migrating versioned data in a configuration management system includes specifying a start time and an end time for at least one historical period. Each historical period has a plurality of versioned data items to be migrated from a first configuration management system to a second configuration management system. For each historical period, a sampling interval that defines a desired time between the version times for the versioned data items to be migrated is specified. For each historical period, an earliest versioned data item is determined based on the specified start time and at least one subsequent versioned data item is determined based on the sampling interval and the specified end time. The earliest versioned data item and the at least one subsequent versioned data item are migrated from the first configuration management system to the second configuration management system for each historical period.

According to another embodiment of the invention, a computer program product for migrating versioned data in a configuration management system includes a computer readable storage medium having computer readable program code embodied therewith. The computer readable program code includes:

computer readable program code configured to determine an earliest versioned data item based on a start time of at least one historical period having a plurality of versioned data items to be migrated from a first configuration management system to a second configuration management system;

computer readable program code configured to determine at least one subsequent versioned data item based on a sampling interval and an end time for each of the historical periods, each sampling interval defining a desired time between the version times for the versioned data items to be migrated for the respective historical period; and computer readable program code configured to migrate the earliest versioned data item and the subsequent versioned data items from the first configuration management system to the second configuration management system for each of the historical periods.

According to another embodiment of the invention, an apparatus for migrating versioned data in a configuration management system includes a user input device and a processor. The user input device is configured for inputting data specifying a start time and an end time for at least one historical period having a plurality of versioned data items to be migrated from a first configuration management system to a second configuration management system. The user input device is also configured for inputting data specifying a sampling interval to define a desired time between the version times for the versioned data items to be migrated for each of the historical periods. The processor is in communication with the user input device and receives the data specifying the start time, end time and sampling interval for each of the historical periods. For each historical period, the processor determines an earliest versioned data item based on the specified start time and determines at least one subsequent versioned data item based on the sampling interval and the specified end time. The processor generates an instruction to a logical module of the first configuration management system to cause a migration of the earliest versioned data item and the at least one subsequent versioned data item from the first configuration management system to the second configuration management system for each historical period.

BRIEF DESCRIPTION OF SEVERAL VIEWS OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

Software configuration management systems have become more commonplace due to the existence of open source and low cost alternatives to higher priced enterprise systems. Consequently, the need to migrate versioned data from one configuration management system to another has increased. As the quantity of data managed by these systems is often large, the ability to practically transfer all of the configuration history, that is, all versions of every data file, requires excessive time and storage capability in the target system environment. Some migration tools allow a user to take a snapshot of a particular version in the source SCM system for use as a development starting point in the target SCM system. Unfortunately, such tools do not allow access to the version history of the migrated files or enable a user to determine when certain changes were introduced into the history. Some methods utilized in other conventional migration tools enable multiple versions to be migrated. These tools generally require that a user manually identify or "tag" known interesting versions in the source SCM system, and then the tool uses the tags to extract the related versions. A version history based on time alone does not necessarily provide a coherent collection of versions. Tagging versions or identifying versions belong to a baseline is a means to establish the coherent relationship between the tagged or identified versions.

The present invention features a method and system for migrating versioned data from a source configuration management system to a target configuration management system. According to an embodiment of the method, a user specifies a historical period from which versioned data items are to be migrated from the source system to the target system. A versioned data item as used with respect to embodiments described herein generally means a data file having a version designation or a group of data files (e.g., a baseline) having a common version designation. The version designation is associated with a version time for the data file or group of data files. A historical period is specified by a user according to a start time and end time. The user also specifies a sampling interval that defines a desired time between versioned data items occurring in the historical period that are to be migrated. The earliest versioned data item is determined based on the specified start time and one or more subsequent versioned data items are determined based on the sampling interval and the specified end time as described in more detail below. The earliest versioned data item and the subsequent versioned data items determined from the historical period are migrated from the source configuration management system to the target configuration management system.

The method of the invention can be implemented independent of a specific vendor implementation that often includes some means of applying metadata to a version (e.g., tagging) to assist in identifying the version as important, for example, as part of a release or to indicate the satisfaction of certain test requirements. However, in a preferred embodiment, the method is applied to a version history that includes only versioned data items that have been tagged or identified as belonging to a baseline. This embodiment enables the sampling of coherent versions in an automated way such that the coherency is preserved in the versioned data items selected for migration.

By using a specified start date, end date and sampling interval, the method of the invention enables an appropriately-sized selection of a subset of versions from a larger version history. In some embodiments, the method utilizes two or more historical periods with each period having a unique sampling interval. For example, the versions selected for migration can be more frequent for a recent historical period than the versions selected from an older historical period of similar duration. In still other options, the sampling interval for a historical period is not a constant value. Instead the sampling interval is based on a user-defined progression so that the interval between versions determined for migration increases or decreases in time. In one embodiment, the sampling interval is defined by a mathematical function based on the time within the historical period.

The method advantageously allows differencing tools supported by the target configuration management system to operate with the migrated data items. Thus differencing tools can compare one version of migrated data with another version of migrated data. The ability to perform comparisons on historical versions makes migration from one configuration management system to another more acceptable.

The method of the invention has additional advantages over standard migration techniques. Migration can be performed substantially faster than if all versions in the history are migrated. In addition, storage requirements are reduced and less clutter (i.e., fewer extraneous versions) occurs in the target configuration management system. Moreover, unlike the snapshot method, at least a portion of the version history prior to migration is useful in the target configuration management system. Unlike the tagging method, user manipulation of data in the source configuration management systems is not required.

Though described below primarily as a method, it will be appreciated by one skilled in the art that aspects of the present invention may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
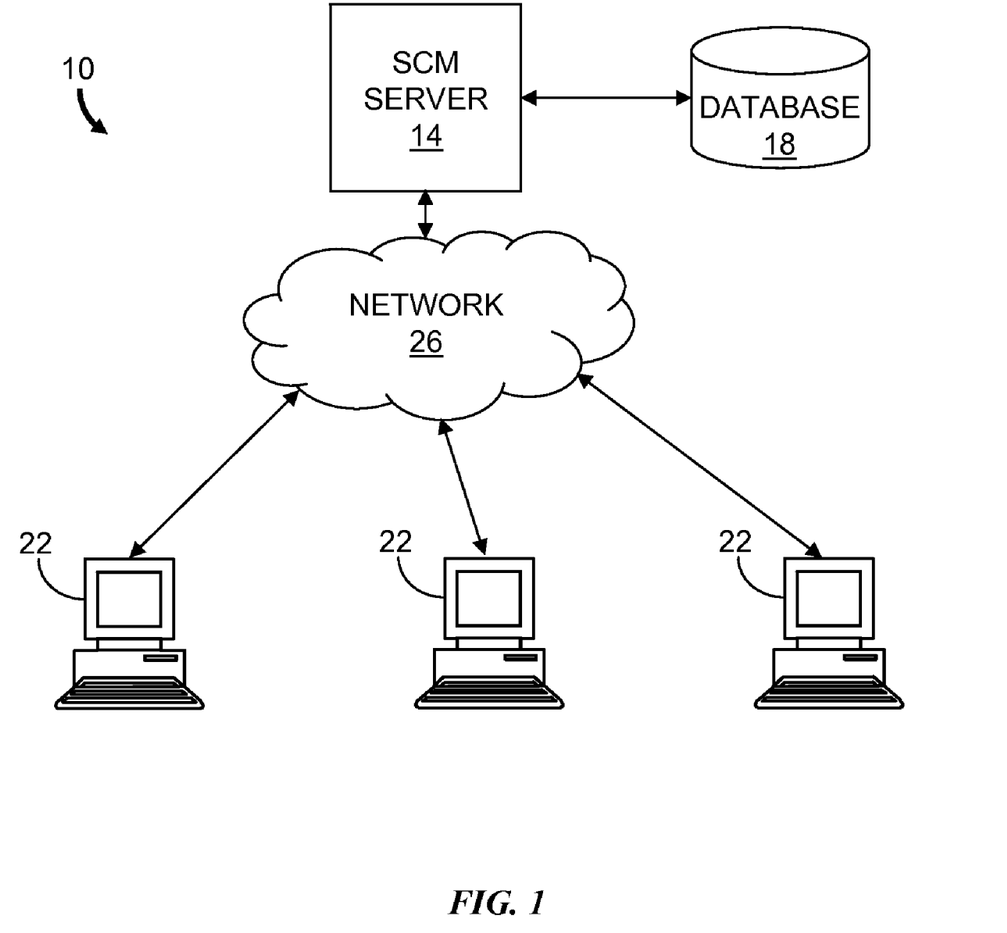
FIG. 1 illustrates a networked environment in which an embodiment of the method of the invention can be practiced.

Referring now to FIG. 1, an embodiment of the method of the invention is implemented in a networked environment 10 by way of a server 14 hosting or supporting a configuration management system such as a SCM system. The SCM server 14 communicates with one or more databases 18 storing versioned data items. Users access the SCM server 14 by way of client devices 22 through an intervening network 26. Preferably the 26 is a local-area network (LAN); however, other network configurations are contemplated including wide-area networks (WAN) such as the Internet or World Wide Web. The server 14 communicates with client devices 22 through one of a variety of connections, such as a standard telephone line, digital subscriber line, LAN or WAN link (e.g., T1, T3), broadband connection (Frame Relay, ATM), or wireless connection (e.g., 802.11(a), 802.11(b), 802.11(g)).

The method executes as a client of the SCM system either on the server 14 or a client device 22. In the illustrated embodiment, the method integrates with an SCM logical module executing on the server 14. Although the illustrated environment 10 includes a single server 14, the method of the invention can be practiced in other environments that having different server, database and client device configurations such as distributed server and/or distributed database configurations.

Figure 2:
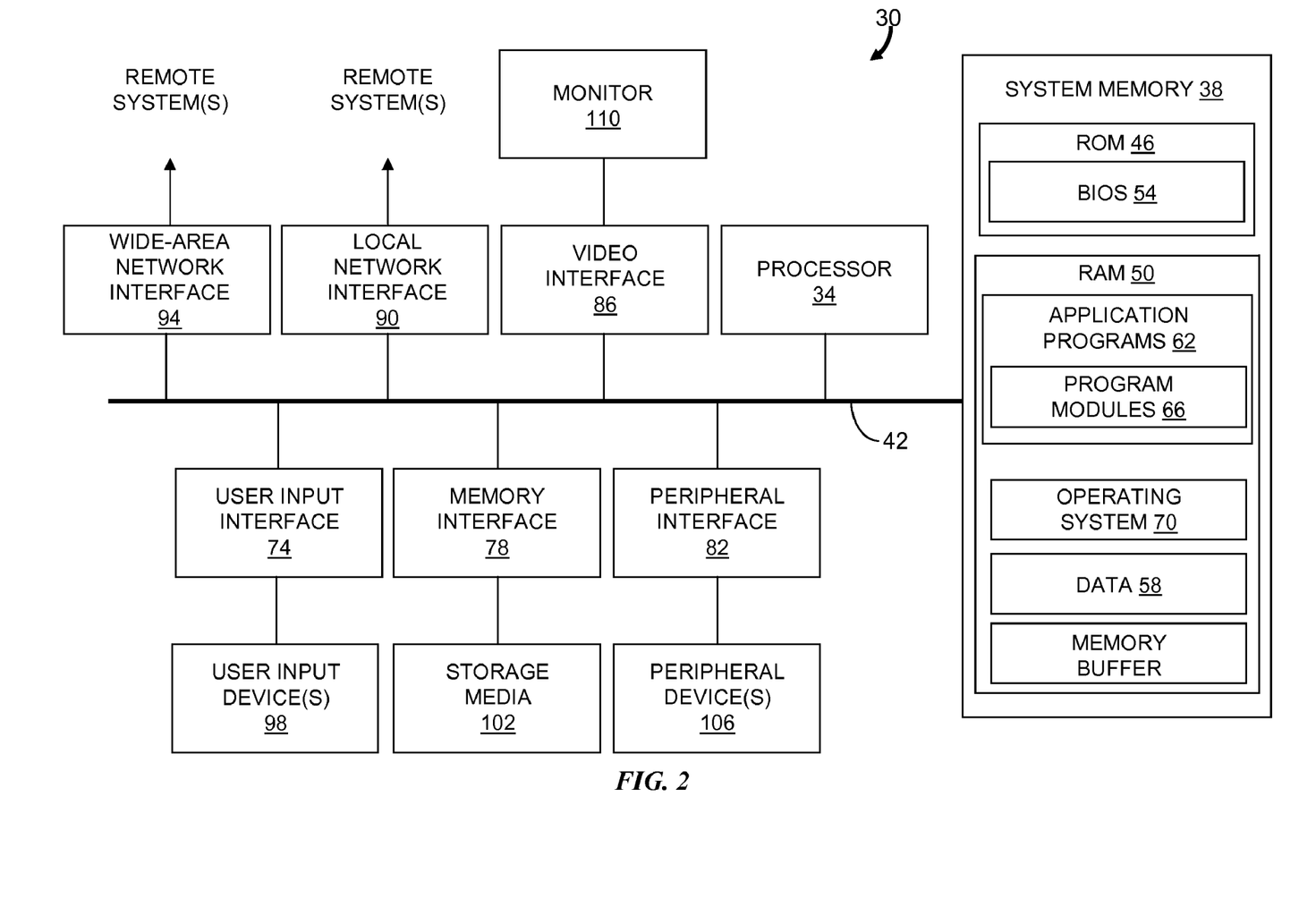
FIG. 2 illustrates a computing device that can be used as the server or one of the client devices depicted in FIG. 1.

FIG. 2 shows an example of a computing device 30 that can be used as the server 14 (or, in other embodiments, a client device 22) of FIG. 1. The computing device 30 includes a processor 34 in communication with system memory 38 over a system bus 42. Exemplary implementations of the computing device 30 as the server 14 or client device 22 include, but are not limited to, a personal computer (PC), a MACINTOSH computer, a workstation, a kiosk, a laptop computer, a server system, a hand-held device such as a personal digital assistant (PDA) and a cellular phone, and a network terminal.

The system memory 38 includes non-volatile computer storage media, such as read-only memory (ROM) 46, and volatile computer storage media, such as random-access memory (RAM) 50. Typically stored in the ROM 46 is a basic input/output system (BIOS) 54, which contains program code for controlling basic operations of the computing device 30, including start-up of the computing device and initialization of hardware. Stored within the RAM 50 are program code and data 58. Program code includes, but is not limited to, application programs 62, program modules 66, and an operating system 70 (e.g., WINDOWS 95, WINDOWS 98, WINDOWS NT 4.0, WINDOWS XP, WINDOWS VISTA, WINDOWS 7, WINDOWS 2000, LINUX and MACINTOSH).

The system bus 42 connects the processor 34 to various other components of the computing device 30, including a user-input interface 74, a memory interface 78, a peripheral interface 82, a video interface 86, a local network interface 90 and a wide-area network interface 94. Exemplary implementations of the system bus 42 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus.

Over a wire or wireless link, the user-input interface 74 is in communication with one or more user-input devices 98, e.g., a keyboard, a mouse, trackball, touch-pad, touch-screen, microphone, joystick, by which a user can enter information and commands into the computing device 30. The memory interface 78 is in communication with removable and non-removable non-volatile storage media 102. Examples of removable and non-removable non-volatile storage media include, but are not limited to, hard disks, optical disks such as CD ROMs, magnetic diskettes, and flash memory cards. Peripheral devices 106, e.g., printers, speakers, scanners, connect to the system bus 42 through the peripheral interface 82 and a display monitor 110 connects to the system bus 42 through the video interface 86.

Figure 3:
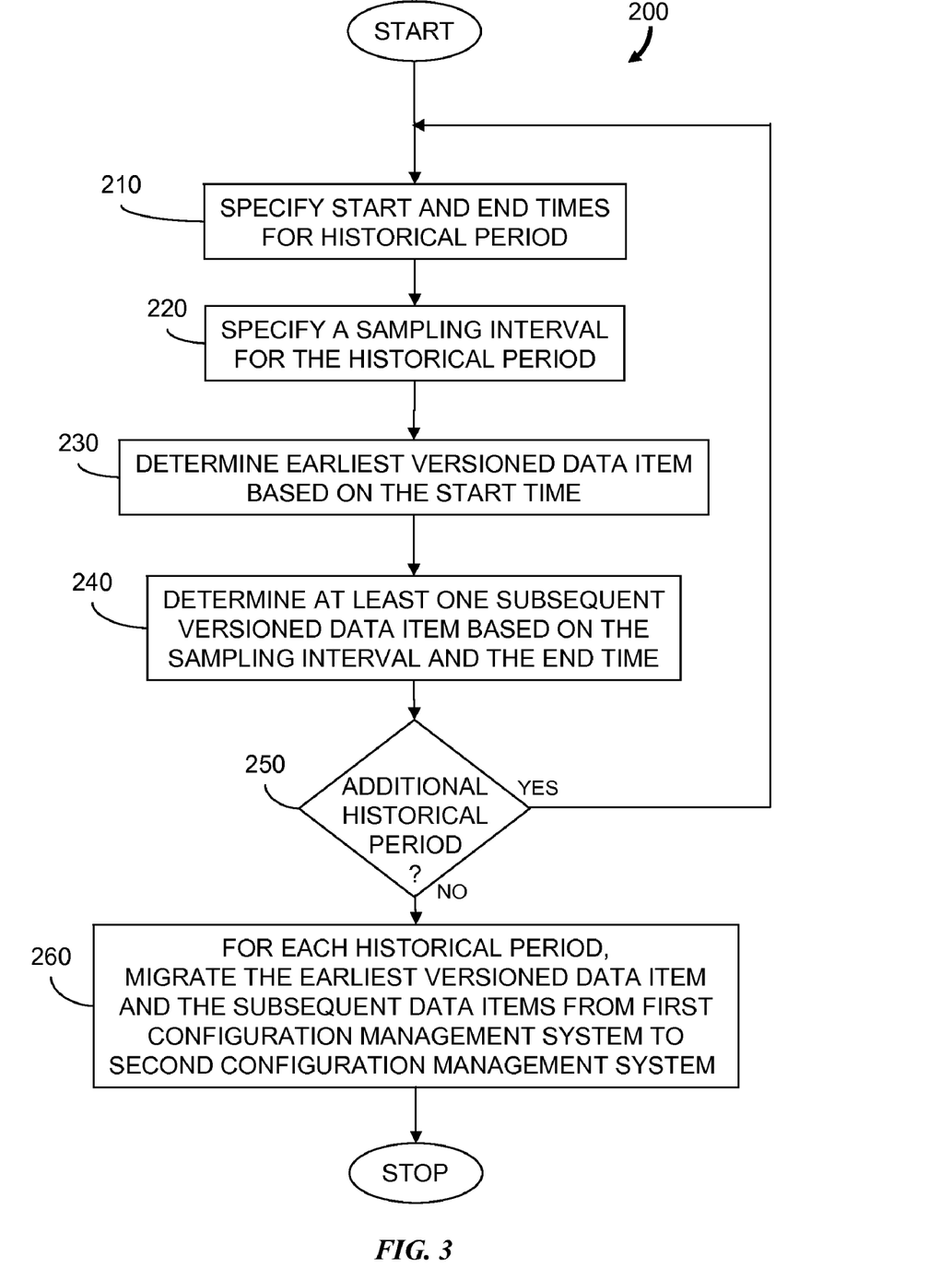
FIG. 3 is a flowchart representation of an embodiment of a method for migrating configuration management data according to the invention.

FIG. 3 shows a flowchart representation of an embodiment of a method 200 for migrating configuration management data according to the invention. The method 200 enables a user to easily and efficiently migrate different versions of data items, i.e., versioned data items, from a first (source) configuration management system to a second (target) configuration management system. In the following description, the configuration management systems are SCM systems although it should be recognized that the method 200 can be applied to other types of configuration management systems to migrate versioned data items from one system to another. For example, other applicable configuration management systems include a document versioning system or other system that maintains versions of data as the data are being revised, and for which the times of such revision events are stored in a historical form.

The source SCM system includes a database that contains the versioned data items. For example, the database may include all versioned data items generated for a software development project. Alternatively, the database may include only versioned data items that have been tagged or identified as belonging to a baseline. Over an extended period of time, there may be a significant number of versions created and stored in the database. A user desiring to transition the project from the source SCM system to the target SCM system specifies (step 210) a historical period by specifying a start time and an end time for the period through a user interface presented to the user on a monitor or display and enabled to accept input data through one or more user input devices such as a keyboard and a mouse. In some implementations where the time difference between consecutive versions for migration is typically greater (e.g., one or more days), the user can specify the start and end times according to calendar weeks or months. In other implementations where the time difference between consecutive versions for migration is more frequent (e.g., hours), the user can specify the times with a finer granularity such as by the day, hour or minute.

The user specifies (step 220) a sampling interval for the historical period. The sampling interval effectively defines the sampling frequency used to determine which versions in the historical period are to be migrated. In general, a small sampling interval results in a greater number of versions determined for migration while a larger sampling interval yields a lesser number of versions for migration.

The earliest versioned data item is determined (step 230) based on the start time. At least one subsequent versioned data item in the historical period is determined (step 240) based on the sampling interval and the end time.

The user has the option to specify more than one historical period. For example, if the full history of versioned data items spans a significant time, a user may elect to migrate a small number of versions from an earlier period and a larger number of versions from a later period of similar duration. In this instance, the user may choose (step 250) to define at least one additional historical period. For each additional historical period a corresponding start and end time, and sampling interval are specified (steps 210 to 240 are repeated).

For each historical period, the earliest versioned data item and the subsequent versioned data items are migrated (step 260) from the source SCM system to the target SCM system. Native operations in the target SCM system are performed on the migrated data items to create compatible versioned data items in the target SCM system.

Figure 4:
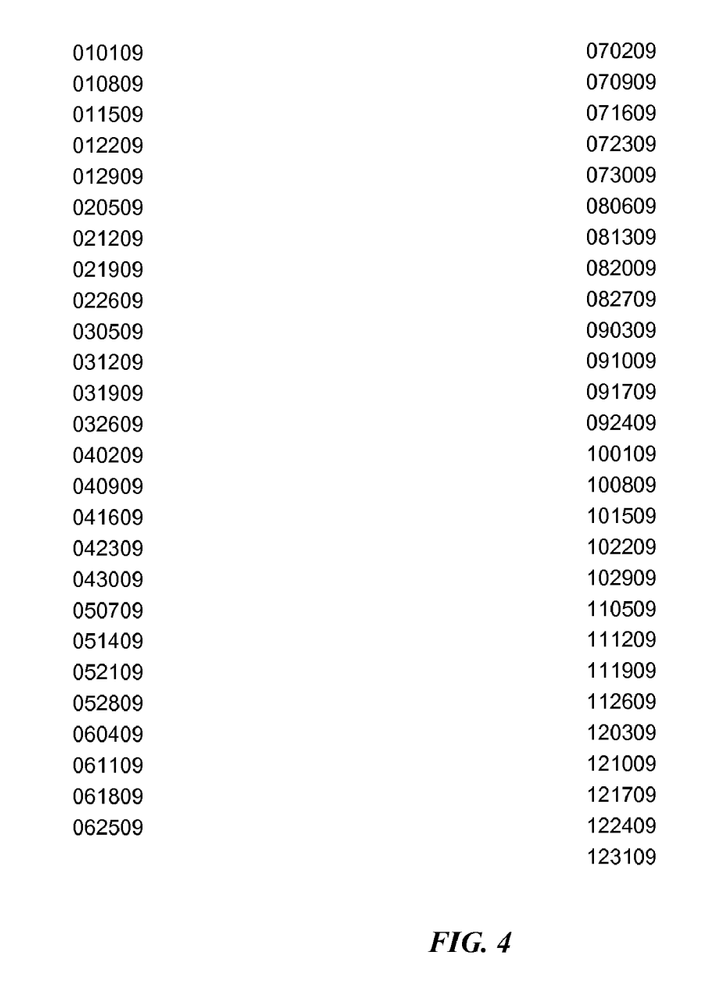
FIG. 4 shows an exemplary version history for data items in a source SCM system in which the versions are listed vertically in chronological order.

FIG. 4 shows an example version history for versioned data items in a source SCM system listed in two vertical columns in chronological order. The versioned data items are based on time although it should be recognized that other version histories may be based on tagged or baselined versioned data items. Each version entry is in the form "MM,DD,YY" where MM, DD and YY are the two-digit representations of the month, day and year for a version. The version history in this example includes consecutive versions separated in time by one week although it should be understood that the separation between consecutive versions across an entire version history is generally not a constant value. In this example, the first version was generated on Jan. 1, 2009 and the last version was generated on Dec. 31, 2009.

Figure 5:
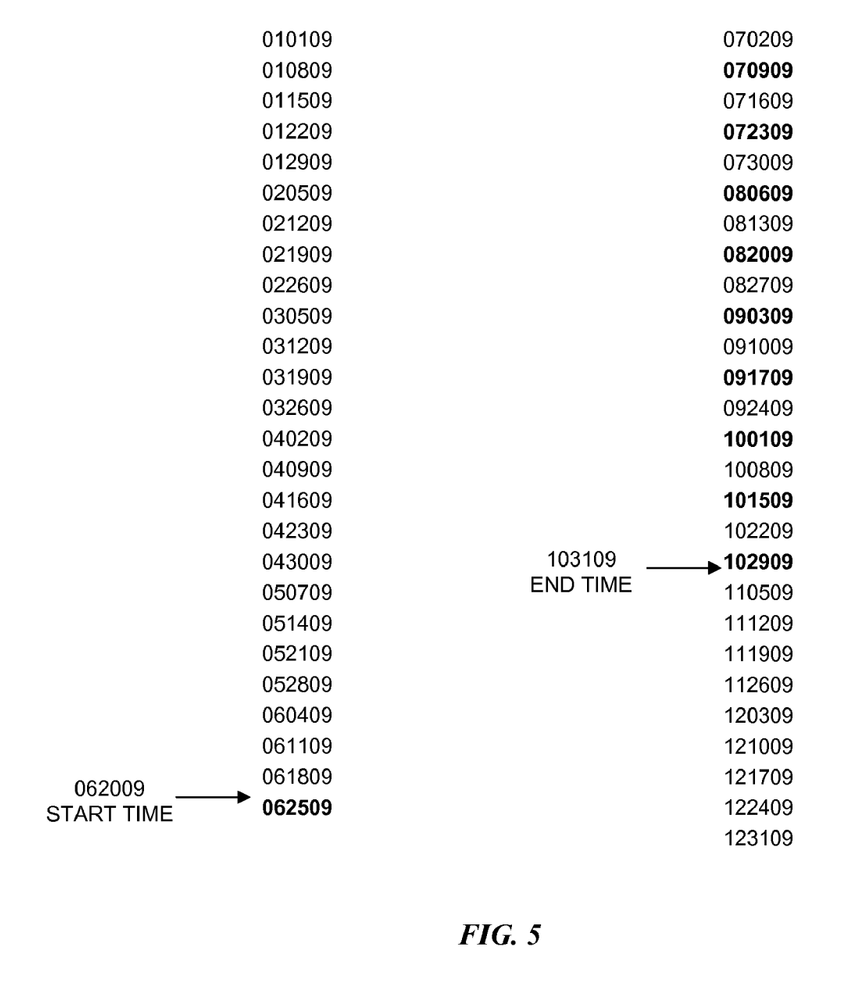
FIG. 5 depicts the version history of FIG. 4 where versions shown in bold text are selected for migration according to an example application of an embodiment of the method of the invention.

FIG. 5 shows the list of FIG. 4 with versions that correspond to versioned data items for migration from a source SCM system to a target SCM system indicated by bold text. In this example, a user has specified a single historical period having a start time of Jun. 20, 2009 and an end time of Oct. 31, 2009 and the specified sampling interval indicating the desired time between migrated versions is two weeks. The earliest version qualifying for migration is Jun. 25, 2009 because it is the first version to occur after the specified start time. Nine subsequent versions for migration are determined based on the two week sampling interval and the Oct. 31, 2009 end time. All versioned data items for the ten qualifying versions are migrated to the target SCM system.

Figure 6:
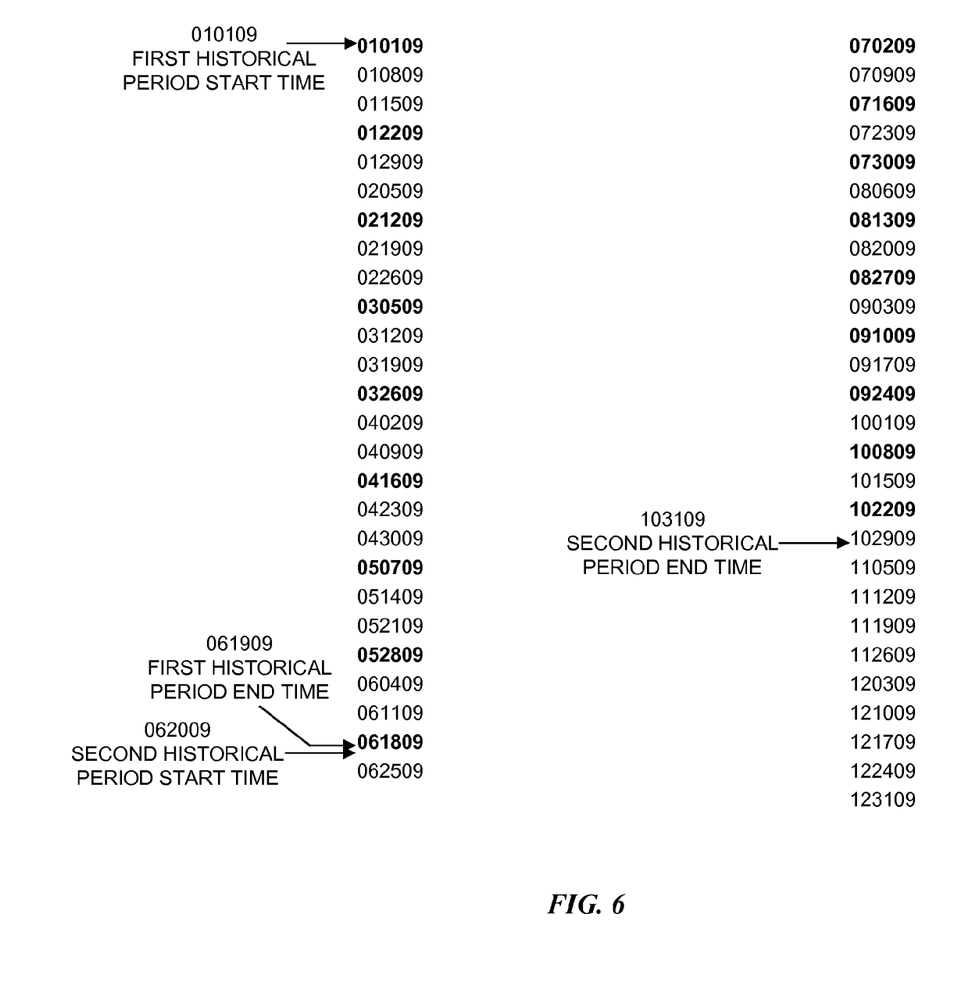
FIG. 6 depicts the version history of FIG. 4 where versions shown in bold text are selected for migration according to an example application of another embodiment of the method of the invention.

FIG. 6 shows another application of an embodiment of the method of the invention based on the version history shown in FIG. 4. In this example, two historical periods are specified by the user. The first historical period has a start time of Jan. 1, 2009 and an end time of Jun. 19, 2009. The second historical period is the same as the historical period for FIG. 5 and therefore the second period has a start time of Jun. 20, 2009 and an end time of Oct. 31, 2009. The user specifies a three week sampling interval for the first historical period and a two week sampling interval for the second historical period. Nine versions are determined for migration from the first historical period and an additional nine versions are determined for migration from the second historical period.

Although the start time, end time and sampling interval of the second historical period are identical to those in the example associated with FIG. 5, the versions determined for migration from this period are shifted later by one week because the method takes into account the time of the most recent one of the versioned data items in the prior (i.e., immediately preceding) historical period. More specifically, the two week sampling interval for the second historical period is applied to the time of the most recent (i.e., latest) versioned data item in the first historical period. Consequently, the earliest version for migration determined from the second historical period is Jul. 2, 2009 and subsequent versions are determined according to the two week sampling interval applied to the time of the earliest version.

Figure 7:
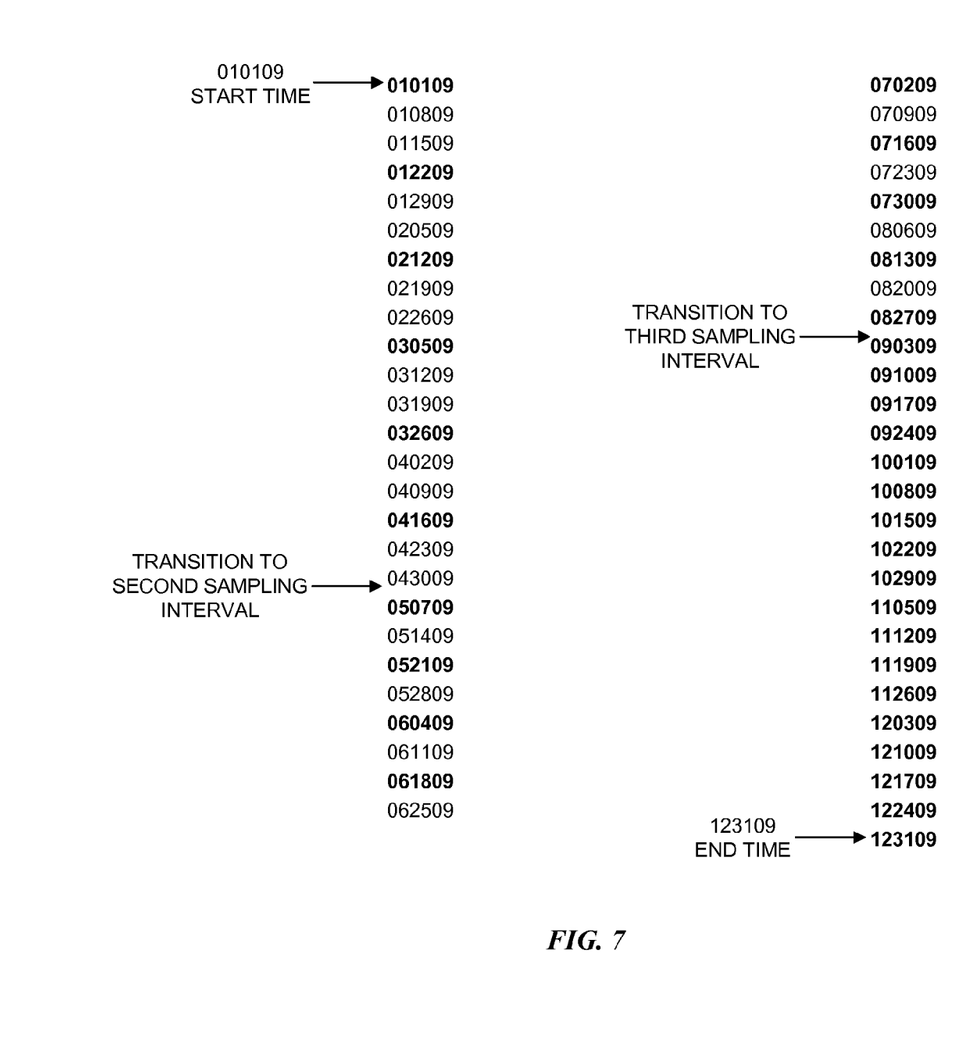
FIG. 7 depicts the version history of FIG. 4 where versions shown in bold text are selected for migration according to an example application of another embodiment of the method of the invention.

FIG. 7 is based on the version history shown in FIG. 4 and shows versions determined for migration according to another embodiment of the method of the invention. A single historical period is specified by the user with a start time of Jan. 1, 2009 and an end time of Dec. 31, 2009. Unlike the examples described above, FIG. 7 illustrates a situation in which the sampling interval is not a constant. Instead, the sampling interval decreases from the start time to the end time. In addition, the user specifies an increment value to indicate how the sampling interval changes across the duration of the historical period. In the illustrated case the increment value is one week.

In this example, the entire historical period is divided equally by the number of possible values of the sampling interval. As three sampling interval values ranging from three weeks to one week are possible, the one year historical period is divided into three equal durations of 121 days and 16 hours. Thus the first duration ends and the second duration begins at 4:00 pm on May 2, 2009, and the second duration ends and third duration begins at 8:00 am on Sep. 1, 2009. Consequently, the first duration contributes only six versions for migration while the second duration contributes nine versions and the third duration contributes eighteen versions.

Different numbers of historical periods and different increment values are possible. For example, if the increment value for the example of FIG. 7 were three days instead of one week, the historical period would include six durations (i.e., five changes in the sampling interval) of 60.83 days for a 365 day calendar year. Thus the six sampling intervals would be 21 days, 18 days, 15 days, 12 days, 9 days and 7 days. In other embodiments the times for starting new durations (i.e., the times for transitioning from one sampling interval to the next sampling interval) are rounded to the nearest date such that they are not dependent on the time of day. In still other embodiments, a mathematical formula is used to define a linear or nonlinear functional relationship between the sampling interval and the time within the historical period. The functional relationship can be evaluated on a real-time basis during execution of the method. Alternatively, the functional relationship can be stored in the form of discrete values in a lookup table to enable the sampling interval to be determined dynamically.

Although the examples provided above relate to versions specified according to historical periods having a resolution of one day and sampling intervals having a resolution of one week, it should be recognized that the times and sampling intervals can be specified with finer or coarser granularity. For example, if the version history includes many version changes occurring on a daily basis, it is preferable to specify the times and sampling interval using a smaller time resolution such as an hour. Conversely, if the version history spans several years or more and version changes typically occur only once every few months or more, it is preferable to specify the times and sampling interval using a coarser time resolution such as a week or a month.

While the invention has been shown and described with reference to specific embodiments, it should be understood by those skilled in the art that various changes in form and detail may be made therein without departing from the spirit and scope of the invention.

What is claimed is:

1. A method for migrating versioned data in a configuration management system, the method comprising:
   for at least one historical period having a plurality of versioned data items to be migrated from a first configuration management system to a second configuration management system, determining an earliest versioned data item based on a start time for the historical period;
   for each of the historical periods, determining at least one subsequent versioned data item based on a sampling interval and an end time for the historical period, the sampling interval defining a desired time between the version times for the versioned data items to be migrated for the historical period; and
   for each of the historical periods, migrating the earliest versioned data item and the subsequent versioned data items from the first configuration management system to the second configuration management system.

2. The method of claim 1 wherein, for each of the historical periods subsequent to a prior historical period, the determination of the earliest versioned data item is based on the start time of the historical period, the sampling interval of the historical period and a time of a most recent one of the subsequent versioned data item of the prior historical period.

3. The method of claim 1 wherein the first and second configuration management systems are software configuration management systems.

4. The method of claim 1 wherein each versioned data item comprises a single data file.

5. The method of claim 1 wherein each versioned data item comprises a plurality of data files having a common version.

6. The method of claim 1 wherein the sampling interval has a constant value.

7. The method of claim 1 wherein each of the versioned data items in each historical period is tagged or identified as belonging to a baseline.

8. The method of claim 1 wherein the sampling interval has a non-constant value that is determined according to a time within the historical period.

9. The method of claim 8 wherein the non-constant value is determined according to the time within the historical period and an increment value.

10. A method for migrating versioned data in a configuration management system, the method comprising:
    specifying a start time and an end time for at least one historical period having a plurality of versioned data items to be migrated from a first configuration management system to a second configuration management system;
    specifying a sampling interval for each historical period, the sampling interval defining a desired time between the version times for the versioned data items to be migrated for the historical period;
    for each of the historical periods, determining an earliest versioned data item based on the specified start time and determining at least one subsequent versioned data item based on the sampling interval and the specified end time; and
    for each of the historical periods, migrating the earliest versioned data item and the at least one subsequent versioned data item from the first configuration management system to the second configuration management system.

11. The method of claim 10 wherein, for each of the historical periods subsequent to a prior historical period, the determination of the earliest versioned data item is based on the specified start time of the historical period, the sampling interval of the historical period and a time of a most recent one of the subsequent versioned data item of the prior historical period.

12. The method of claim 10 wherein each versioned data item comprises a single versioned data file.

13. The method of claim 10 wherein each versioned data item comprises a plurality of data files having a common version.

14. The method of claim 10 wherein the sampling interval has a constant value.

15. The method of claim 10 wherein each of the versioned data items in each historical period is tagged or identified as belonging to a baseline.

16. The method of claim 10 wherein the sampling interval has a non-constant value that is determined according to a time within the historical period.

17. The method of claim 16 further comprising specifying an increment value and wherein the non-constant value is determined according to the time within the historical period and the increment value.

18. A computer program product for migrating versioned data in a configuration management system, the computer program product comprising:
    a computer readable storage medium having computer readable program code embodied therewith, the computer readable program code comprising:
        computer readable program code configured to determine an earliest versioned data item based on a start time of at least one historical period having a plurality of versioned data items to be migrated from a first configuration management system to a second configuration management system;
        computer readable program code configured to determine at least one subsequent versioned data item based on a sampling interval and an end time for each of the historical periods, each sampling interval defining a desired time between the version times for the versioned data items to be migrated for the respective historical period; and
        computer readable program code configured to migrate the earliest versioned data item and the subsequent versioned data items from the first configuration management system to the second configuration management system for each of the historical periods.

19. The computer program product of claim 18 wherein, for each of the historical periods subsequent to a prior historical period, the determination of the earliest versioned data item is based on the start time of the historical period, the sampling interval of the historical period and a time of a most recent one of the subsequent versioned data item of the prior historical period.

20. The computer program product of claim 18 wherein the sampling interval has a constant value.

21. The computer program product of claim 18 wherein the sampling interval has a non-constant value that is determined according to a time within the historical period.

22. The computer program product of claim 21 wherein the non-constant value is determined according to the time within the historical period and an increment value.

23. An apparatus for migrating versioned data in a configuration management system, comprising:
    a user input device configured for inputting data specifying a start time and an end time for at least one historical period having a plurality of versioned data items to be migrated from a first configuration management system to a second configuration management system, the user input device further configured for inputting data specifying a sampling interval to define a desired time between the version times for the versioned data items to be migrated for each of the historical periods; and
    a processor in communication with the user input device, the processor receiving the data specifying the start time, end time and sampling interval for each of the historical periods, the processor determining for each of the historical periods an earliest versioned data item based on the specified start time and determining at least one subsequent versioned data item based on the sampling interval and the specified end time, the processor generating an instruction to a logical module of the first configuration management system to cause a migration of the earliest versioned data item and the at least one subsequent versioned data item from the first configuration management system to the second configuration management system for each of the historical periods.

* * * * *